(12) United States Patent
Chen et al.

(10) Patent No.: US 6,396,066 B1
(45) Date of Patent: May 28, 2002

(54) IMAGE STORAGE PHOSPHOR PANELS HAVING FLEXIBLE SUPPORTS

(75) Inventors: Wen-Li A. Chen; Arthur P. Chipouras, both of Rochester; Terry A. Heath, Caledonia; William A. Mruk; David J. Steklenski, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 68 days.

(21) Appl. No.: 09/667,150

(22) Filed: Sep. 21, 2000

(51) Int. Cl.[7] .................................................. G01T 1/00
(52) U.S. Cl. ..................................... 250/488.1; 250/580
(58) Field of Search ............................. 250/488.1, 580

(56) References Cited

U.S. PATENT DOCUMENTS

| | | | | |
|---|---|---|---|---|
| 4,574,195 A | * | 3/1986 | Teraoka et al. | 250/327.2 |
| 4,603,260 A | * | 7/1986 | Takano | 250/484.1 |
| 4,741,933 A | * | 5/1988 | Kano et al. | 250/488.1 |
| 4,835,386 A | * | 5/1989 | Shimura et al. | 250/327.2 |
| 4,944,026 A | * | 7/1990 | Arakawa et al. | 250/488.1 |
| 4,963,751 A | * | 10/1990 | Kano et al. | 250/488.1 |
| 5,381,015 A | | 1/1995 | Dooms | |
| 5,401,971 A | | 3/1995 | Roberts | |
| 5,646,412 A | | 7/1997 | Bryan et al. | |
| 5,877,508 A | * | 3/1999 | Arakawa et al. | 250/588 |

OTHER PUBLICATIONS

AGFA Technical Bulletin, "ADC Imaging Plate", Jun., 1997.

* cited by examiner

Primary Examiner—Scott J. Sugarman
Assistant Examiner—Mohammed Hasan
(74) Attorney, Agent, or Firm—J. Lanny Tucker

(57) ABSTRACT

A radiographic storage panel includes a storage phosphor layer disposed on a unique support that comprises two or more separate flexible substrates that are laminated or adhered together.

18 Claims, 1 Drawing Sheet

IMAGE STORAGE PHOSPHOR PANELS HAVING FLEXIBLE SUPPORTS

FIELD OF THE INVENTION

This invention relates to radiographic articles used in radiographic imaging. More particularly, it relates to coated radiographic phosphors and radiographic image storage phosphor panels useful in radiographic imaging.

BACKGROUND OF THE INVENTION

Radiographic phosphor panels generally contain a phosphor layer on a suitable support. Phosphors are crystalline materials that respond to X-radiation (X-rays) on an imagewise basis. Like many other crystalline materials, radiation phosphors have a crystal matrix that allows for the replacement of some atoms by other similar atoms, but does not accept other atoms or moieties. Radiographic phosphor panels can be classified based upon their phosphors, as prompt emission panels (or intensifying or conversion panels) and image storage panels. Both types of panels are also known in the art as "screens".

Image storage panels comprise storage phosphors that have the capability of storing latent X-rays for later release, apparently by locally trapping electron-hole pairs created by incident X-rays. Storage phosphors are distinguishable from the phosphors used in intensifying or conversion panels. In the intensifying or conversion panels, a latent image is not stored but X-rays cause an immediate release of visible light from irradiated phosphor crystals.

Radiation storage panels are used in computed radiography. The panel is first exposed to X-rays to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted radiation is then collected and the resulting signal is processed electronically to produce a final image.

Radiographic panels or screens comprise a support, a luminescent layer that includes the radiographic phosphor, and optionally an overcoat layer to protect the phosphor layer from mechanical damage due to scratches and abrasion. An overcoat layer is desirably, substantially clear and transparent to the radiation emitted by the radiation phosphor.

The radiographic panel support is typically a flexible material such as a polymeric film such as a poly(ethylene terephthalate) or cellulose acetate film, or a cellulosic material such as paper or cardboard. The support provides the required stiffness for the radiographic panel so it can stand any physical abuse during use. In these cases, a relatively thick support provides the desired stiffness. While such support materials can be manufactured, the manufacturing process is difficult and unpredictable in yielding the desired properties such as optical clarity. That is, they are usually too hazy. Such supports are not ideal for radiographic panels because the haze can scatter impacting laser radiation causing a sufficient loss in image resolution.

This problem can be remedied by coating a layer on the support that will absorb the laser radiation under the phosphorescent layer, but this adds additional coating steps and can create adhesion problems. One might also coat the absorbing layer on the back of the support, but in the case of a light-scattering support, this location is also ineffective.

Thus, there is a need to provide radiographic storage panels that have optically clear flexible supports that can be easily fabricated to have the desired thickness.

SUMMARY OF THE INVENTION

This invention provides a radiographic storage panel comprising a support having thereon a storage phosphor layer, the support comprising two or more flexible substrates adhered to each other.

Another embodiment of this invention is a radiographic storage panel having an overcoat layer over a storage phosphor layer, which storage phosphor layer is disposed on a support comprising two or more flexible substrates adhered to each other.

Further, this invention provides a radiographic assembly comprising a light-tight container having therein the radiographic storage panel described above.

The radiographic panels of this invention exhibit a number of advantages. They comprise a support that is optically clear and suitably flexible for the intended properties. Supports of various materials can be prepared to have varying thickness by varying the number of laminated or adhered flexible substrates and their individual thickness. The choice of substrate materials, adhesive and laminating parameters also allow considerable flexibility to control curl while providing the desired optical clarity, thickness and durability. It may also be advantageous to use a colored adhesive or laminated substrates to adjust image quality.

DETAILED DESCRIPTION OF THE INVENTION

The radiographic storage panels of this invention comprises a multilayer support, one or more storage phosphor layers and optionally a protective overcoat layer, all of which are described in more detail below.

Figure 1:
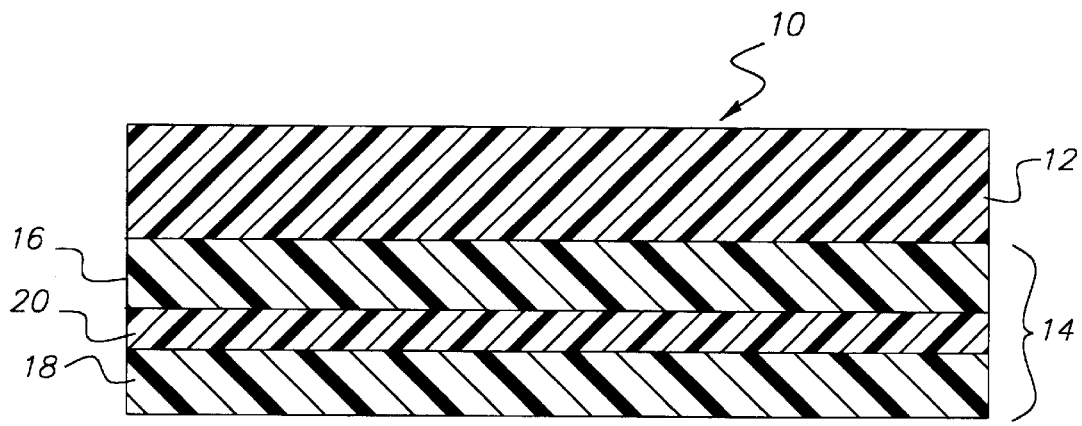
FIG. 1 is an enlarged cross-sectional view of a storage panel of this invention having a support composed of two adhered substrates.
Figure 2:
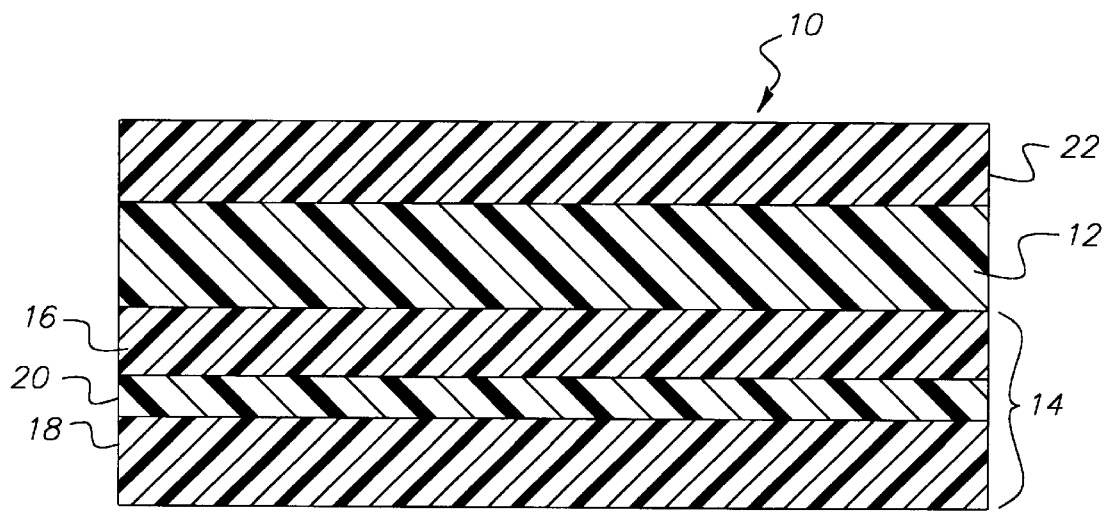
FIG. 2 is an enlarged cross-sectional view of a preferred storage panel of this invention having a support of two adhered substrates and a protective overcoat layer.

Specific embodiments of the invention are illustrated in FIGS. 1 and 2. For example, in FIG. 1, storage panel 10 has storage phosphor layer 12 disposed on support 14 that is composed of two flexible substrates 16 and 18 that are adhered using adhesive layer 20.

FIG. 2 illustrates an embodiment that is similar to that shown in FIG. 1 (having the same components), but in addition comprises protective overcoat layer 22 on storage phosphor layer 12.

The supports used in the storage panels of this invention comprise two or more flexible substrates laminated or adhered to each other. These two or more substrates can be composed of the same or different polymeric materials and can have the same or different thickness, optical properties and mechanical properties such as stiffness and elasticity. The surface of the support must be resistant to the various solvents that may be used to coat the phosphor layer(s) if those layers are directly applied without a subbing layer. Preferably, the substrate closest to the storage phosphor layer is optically clear and transparent.

Useful flexible materials include polymeric films, papers, cardboard, metallic foils, and polymeric films are preferred. Examples of such polymers materials include but are not limited to, polyesters [such as poly(ethylene terephthalate) and poly(ethylene naphthalate)], polystyrenes (including polystyrene copolymers and styrene derivative polymers), cellulose esters (for example, cellulose acetate ), poly (methyl methacrylate) (including methyl methacrylate copolymers and methyl methacrylate derivative polymers), polyamides, polysulfones, polyetherketones, and polyphenylene oxide materials. The polyesters are most preferred and poly(ethylene terephthalate) is the best polyester to use.

One or more of the flexible substrates can be colored or pigmented to make them reflective or absorptive by incorporating suitable dyes or pigments during film manufacture. The substrates can be made reflective by incorporating titania, zinc oxide or barium sulfate. Other opacifying agents (reflective microlenlets) are described in U.S. Pat. No. 4,912,333 (Roberts et al.). In those instances in which it is desired to reduce the effective thickness of the support, one or more of the substrates can be modified to impart a small, but significant degree of light absorption. Air can be trapped in the one or more substrates or between the adhered substrates to reflect ultraviolet and/or visible radiation.

The two or more substrates can be laminated or adhered together using various adhesive materials such as polyethylene, poly(ethylene-co-acrylic acid), poly(ethylene-co-methacrylic acid), polyethylene-based hot melt adhesives, ionomers such as Surlyn, and any of the many known pressure sensitive adhesives such as those described in *Handbook of Adhesives* ed. Irving Chapman, Chapman and Hall, 1990.

Alternatively, the two or more substrates can be co-extruded to provide a laminate of the individual substrates. In such embodiments, one or more of the substrates are tinted as described below to absorb stimulating radiation. Substrates can be tinted by the incorporation of conventional dyes and pigments (for example carbon black, titanium dioxide, or barium sulfate) within the extruded polymeric materials.

Useful methods of lamination are described generally in the literature such as *The Encyclopedia of Plastics Equipment,* Herbert R. Simonds (ed.), Reinhold Publishing Corporation, and *Extrusion Coating Manual* 4$^{th}$ Edition, November 1998, TAPPI Press.

In a preferred practice of the invention, the substrates are adhered using a tinted adhesive material (such as a tinted polyethylene-based hot melt adhesive) comprising a tinting substance. Such adhesive materials are designed to absorb the stimulating radiation used to read the storage phosphor plate. The tinting substances can be any conventional dyes or pigments chosen such that their absorbance matches the output of the stimulating light source. A particularly preferred tinting material is carbon black. While the level of the tinting substance is not critical, it is preferred that the density at the stimulating wavelength be at least 1.5 and preferably greater than 2.5.

The support used in this invention containing two or more flexible substrates generally has a total dry thickness of at least 200 μm, and preferably from about 300 μm to about 450 μm. This total support thickness can be divided among the individual substrates in any suitable proportion.

Disposed on the support is one or more storage phosphor layers composed of one or more phosphors coated admixture with one or more binders. Useful phosphors are numerous and from a practical point of view, they usually give stimulable emission at a wavelength in the range of from about 360 nm to about 440 nm when excited with stimulating radiation in the wavelength range of from about 600 nm to about 670 nm.

Examples of suitable phosphors include the various classes of materials described in U.S. Pat. No. 4,835,397 (Arakawa et al.) and U.S. Pat. No. 5,381,015 (Dooms), both incorporated herein by reference and including for example divalent europium and other rare earth activated alkaline earth metal halide phosphors and rare earth element activated rare earth oxyhalide phosphors. More preferred phosphors include alkaline earth metal fluorohalide storage phosphors (particularly those containing iodide such as alkaline earth metal fluorobromoiodide storage phosphors as described in U.S. Pat. No. 5,464,568, of Bringley et al.).

Preferably, the phosphor layer(s) comprise one or more phosphors that contain iodide in one or more of those layers. In particular, the alkaline earth metal phosphors useful in the practice of this invention are the products of firing starting materials comprising optional oxide and a combination of species characterized by the following formula (1):

$$MFX_{1-z}I_zuM^aX^a:yA: eQ:tD \qquad (1)$$

wherein "M" is magnesium (Mg), calcium (Ca), strontium (Sr) or barium (Ba), "F" is fluoride, "X" is chloride (Cl) or bromide (Br), "I" is iodide, $M^a$ is sodium (Na), potassium (K), rubidium (Rb) or cesium (Cs), $X^a$ is fluoride, chloride (Cl), bromide (Br) and iodide (I), "A" is europium (Eu), cerium (Ce), samarium (Sm) or terbium (Tb), "Q" is BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, or $ThO_2$, "D" is vanadium (V), chromium (Cr), manganese (Mn), iron (Fe), cobalt (Co) or nickel (Ni). The numbers in the noted formula are the following: "z" is $1\times10^{-4}$ to 1, "u" is from 0 to 1, "y" is from $1\times10^{-4}$ to 0.1, "e" is form 0 to 1, and "t" is from 0 to 0.01. These definitions apply wherever they are found in this application unless specifically stated to the contrary. It is also contemplated that "M", "X", "A" and "D" represent multiple elements in the groups identified above.

In some embodiments, the divalent alkaline earth metal fluorohalide phosphors containing iodide are the product of firing an intermediate, comprising oxide and a combination of species characterized by the following formula (2):

$$(Ba_{1-a-b-c}Mg_aCa_bSr_c)FX_{1-z}I_zrM^aX^a:yA \qquad (2)$$

wherein X, $M^a$, $X^a$, A, z and y have the same meanings as for formula (1) and the sum of a, b and c is from 0 to 4, and r is from $10^{-6}$ to 0.1. Some embodiments of these phosphors are described in more detail in U.S. Pat. No. 5,464,568 (Bringley et al.), incorporated herein by reference.

It is more preferred that the phosphor be a storage phosphor produced utilizing an oxosulfur reducing agent containing phosphor intermediate as described in U.S. Pat. No. 5,427,868 (Bringley et al.), incorporated herein by reference.

Examples of other stimulable phosphors employable in the radiation image storage panel include: SrS:Ce,SM, SrS:Eu,Sm, ThO2:Er, La2O2S:Eu,Sm, ZnS:Cu,Pb, and other stimulable phosphors as described in U.S. Pat. No. 5,227,253 (noted above).

The phosphors useful herein can be provided as particulate materials disposed within the binder, or in the form of particles encapsulated with a polymeric material (like a core-shell arrangement). Various polymeric shell materials include polyesters, nitrocellulose, polyalkyl acrylates and methacrylates, as well as vinyl epoxy resins described in U.S. Pat. No. 5,646,412 (Bryan et al.). A coupling agent can be used to facilitate the formation of the polymer shell directly onto the surface of the phosphor particles and to provide good adhesion between the two components.

A mixture of phosphors can be used, and particularly a mixture of phosphors containing iodide is useful. If more than one storage phosphor layers are used, those layers can be composed of the same or different storage phosphors and the same or different binders. The multiple phosphor layers can also have the same or different thickness. The amount of the one or more phosphors in the phosphor layers is generally at least 50 weight percent, and preferably from about 80 to about 98 weight percent, based on total dry layer weight.

The phosphor layers comprise one or more binders to give the layers structural coherence. In general, the binders useful in this invention are those conventionally used for this purpose in the art. They can be chosen from a wide variety of known organic polymers that are transparent to X-radiation, stimulating and emitted radiation. Binder materials commonly used for this purpose include but are not limited to, natural polymers such as proteins (for example gelatins), polysaccharides (such as dextrans), poly(vinyl acetate), ethyl cellulose, vinylidene chloride polymers, cellulose acetate butyrate, polyvinyl alcohol, sodium o-sulfobenzaldehyde acetal of poly(vinyl alcohol), chlorosulfonated poly(ethylene), a mixture of macromolecular bisphenol poly(carbonates), and copolymers comprising bisphenol carbonates and poly(alkylene oxides), aqueous ethanol soluble nylons, poly(alkyl acrylates and methacrylates) and copolymers of poly(alkyl acrylates and methacrylates and acrylic acid or methacrylic acid) and poly(vinyl butyral) and poly(urethanes) elastomers. Mixtures of binders can be used if desired. These and other useful binder materials are described in U.S. Pat. No. 2,502,529 (Luckey), U.S. Pat. No. 2,887,379 (Ralph et al.), U.S. Pat. No. 3,617,285 (Staudenmeyer), U.S. Pat. No. 3,300,310 (Kenneth et al.), U.S. Pat. No. 3,300,311 (Kenneth et al.), U.S. Pat. No. 3,743,833 (Martic et al.), U.S. Pat. No. 4,574,195 (Teraoka et al.), and in *Research Disclosure* Vol. 154, February 1977, publication 15444 and Vol. 182, June 1979. *Research Disclosure* is published by Kenneth Mason Publications, Ltd. Emsworth, Hampshire P010 7DD England (also available from Emsworth Design Inc., 147 West 24$^{th}$ Street, New York N.Y. 10011)

Particularly useful binders are polyurethanes such as those commercially available as ESTANE polyurethanes from Goodrich Chemical Co., PERMUTHANE polyurethanes from Permuthane Division of ICI.

The binder(s) are present in the phosphor layers in an amount of at least 3 weight percent, and preferable from about 5 to about 12.5 weight percent, based on total phosphor dry weight.

Any conventional ratio of phosphor to binder can be used in the panels of this invention. Generally thinner phosphor layers and sharper images are obtained when a high weight ratio of phosphor to binder is used. Preferably phosphor to binder weight ratios are in the range of from about 7:1 to about 30:1. More or less binder can be used if desired for specific applications.

The one or more phosphor layers can include other addenda that are commonly employed for various purposes, including but not limited to reducing agents (such as oxysulfur reducing agents), phosphites and organotin compounds to prevent yellowing, dyes and pigments for light absorption, plasticizers, dispersing aids, surfactants, and antistatic agents, all in conventional amounts.

The one or more phosphor layers in the storage panels generally have a total dry thickness of at least 50 $\mu$m, and preferably from about 100 $\mu$m to about 400 $\mu$m.

The storage panels of this invention preferably include a protective overcoat layer disposed on the one or more phosphor layers. This layer is substantially clear and transparent to the light emitted by the phosphor and provides abrasion and scratch resistance and durability. It may also be desirable for the overcoat layer to provide a barrier to water or water vapor that may degrade the performance of the phosphor. Further, it may be desirable to incorporate components into the overcoat layer that prevent yellowing of the storage panel.

The protective overcoat layer is composed predominantly of one or more film-forming binder materials that provide the desired properties. Generally, these are the same materials that are used as binders in the phosphor layer(s). However, they can be different materials as well.

Many such materials are known in the art, including but not limited to, polyesters [such as poly(ethylene terephthalate)], polyethylene, polyamides, poly(vinyl butyral), poly(vinyl formal), polycarbonates, vinyl chloride polymers, acrylic polymers [such as poly(methyl methacrylate) and poly(ethyl methacrylate)], and various polymer blends of fluorinated polymers and non-flourinated polymers [such as blends of polyacrylates and vinylidene fluoride polymers. Mixtures of materials can be used if desirable. Other useful overcoat materials are described in U.S. Pat. No. 4,574,195 (Teraoka et al.), U.S. Pat. No. 5,401,971 (Roberts), U.S. Pat. No. 5,227,253 (Takasu et al.), U.S. Pat. No. 5,475,229 (Itabashi et al.), all incorporated herein by reference. The preferred materials are poly(vinylidene fluoride-co-tetrafluoroethylene), poly(vinylidene fluoride-co-cholorotrifluoroethylene), and blends of poly(vinylidene fluoride-co-tetrafluoroethylene) and poly[($C_{1-2}$ alkyl)methacrylate].

The protective overcoat may also be formed through the use of radiation curable compositions as those described in U.S. Pat No. 5,149,592 (Wojnarowicz).

In addition to the film forming polymer, the overcoat may contain a variety of agents designed to enhance its utility. Such agents include solid particulate materials or mattes as described in U.S. Pat. No. 4,059,768 (VanLandeghem et al.) and antistatic agents as described in U.S. Pat No. 5,569,485 (Dahlquist et al.).

The protective overcoat layer can extend over the storage panel to seal the edges of the phosphor layer(s) or a separate seal may be applied using the same composition as that of the overcoat or a different composition.

The protective overcoat generally has a total dry thickness of at least 5 $\mu$m, and preferably from about 6 $\mu$m to about 18 $\mu$m.

While anticurl layers are not required for the storage panels of this invention, they are generally preferred in order to balance the forces exerted by the coating of the phosphor layer(s) and protective overcoat. Materials used to form anticurl layers include those identified above for use as binder materials or overcoat layer materials.

Subbing layers may be disposed between the support and the phosphor layer(s) is desired to enhance layer adhesion. Materials useful for this purpose are those conventionally used in subbing layers in photographic silver halide materials and are described for example in *Research Disclosure* Vole. 176, December 1978, publication 17643 (Section XVII) and Vol. 184, August 1979, publication 18431 (Section I).

Besides the configurations illustrated in FIGS. 1 and 2, any one or combination of conventional storage panel features compatible with the features described herein specific to the invention can, of course, be employed in the practice of this invention. Conventional storage panel constructions are described for example in U.S. Pat. No. 4,380,702 (Takahashi et al.), incorporated herein by reference. Conventional panel constructions are also shown in *Research*

Disclosure Vol. 184, August 1979, publication 18431, also incorporated herein by reference.

The storage panels of this invention can be prepared using conventional coating techniques using conventional solvents and dispersing techniques. Generally, a phosphor powder and other addenda are mixed into a solution of a binder material and a suitable solvent (such as alcohols, chlorinated hydrocarbons, ketones and esters of lower alcohols) and coated using any suitable means including blade and knife coating onto the support described herein. U.S. Pat. No. 4,505,989 (Umemoto et al.), U.S. Pat. No. 4,835,397 (Arakawa et al.), and U.S. Pat. No. 5,381,015 (noted above), all incorporated herein by reference, for example, describes suitable techniques for making the storage panels of this invention. The protective overcoat layer can be applied from the same or different solvent over the phosphor layer(s) in the same manner. Alternatively, the protective overcoat layer can be fixed on the phosphor layer using a suitable adhesive before the laminate is applied to the support described herein.

One or more radiographic storage panels of this invention can be incorporated into a radiographic assembly that comprises a suitable light-tight container and the storage panel therein. This assembly can have the conventional construction for such assemblies (or cassettes) as described for example in U.S. Pat. No. 5,912,944 (Budinski et al.), U.S. Pat. No. 4,380,087 (Tanaka), and U.S. Pat. No. 4,166,958 (Haselbarth)

The following examples are presented to further illustrate the present invention and to show some preferred embodiments thereof. The invention is not to be construed as limited thereto. Unless otherwise indicated, all materials used in the examples are commercially available.

The X-ray storage phosphors used to prepare storage panels were prepared by the following procedure.

Preparation of $BaFBr_{0.80}I_{0.20}$:0.001 $Eu^{2+}$:

In a 2000 ml beaker containing a Teflon coated magnetic stir bar, 269.54 g of $BaBr_2.2H_2O$ and 62.22 g of $BaI2.2H_2O$ were dissolved in a 2- to 3-fold excess of distilled water. The solution was then filtered. To the filtered solution were added 2.88 g of fumed silica and 0.500 g of $BaS_2O_3.H_2O$ followed by 0.176 g of KBr. $BaF_2$ (167.5 g) containing 0.002 moles of $EuF_2$ and 0.01 moles of $CaF_2$ were then added to the solution slowly with vigorous stirring. Stirring was maintained for about 1 hour and the resulting slurry was then spray-dried through an air driven rotary atomizer at an inlet temperature of 350° C. and an outlet temperature of 110° C. The resulting white powder was then placed into alumina crucibles and fired at a temperature of 840°–860° C. for 3.5 hours under flowing nitrogen. After being allowed to cool under nitrogen, the phosphor powder was then ground and filtered through a 38 μm screen to yield the finished phosphor.

Preparation of Image Storage Panels:

Image storage panels were prepared by the following general procedure. Phosphor and oxosulfur reducing pigment, if any, were dispersed in a 13% (weight/weight) solution of PERMUTHANE TMU-6366 polyurethane (ICI Polyurethanes Group of West Deptford, N.J.) in a 93:7 (weight/weight) dicchloromethane/methanol solvent mixture. The dispersions were frequently milled 30 minutes with zirconium oxide beads on a paint shaker. The phosphor to binder ratio was about 15:1. Knife-coatings were prepared on a polyethylene terephthalate film support and allowed to air-dry to produce luminescent layers.

After drying, except where noted, the completed storage panels were knife-coated with an overcoat layer solution prepared as follows. The overcoat polymer (FK 800, 3M Corp.) was dissolved in acetone at approximately 15% by weight and stirred until a clear solution was formed. The overcoat was formed over the dried phosphor by knife coating and then drying in air.

The relative photostimulated luminescence (PSL) intensity of the resulting image storage panels was measured by cutting 2.6 cm-diameter disks from the panels, and simultaneously exposing the sample and a standard to filtered X-radiation. The X-ray source was a tungsten target tube operating at 70 kVp and 3.0 mA. The filtration consisted of a 3.5 cm thick aluminum sheet. After exposure to X-rays, the samples and standard were stimulated with a 4-millisecond pulse at 633 nm from a 12 mW helium-neon laser. The stimulated emission was detected using a photomultiplier tube after passing through a Schott BG-25 filter. The responses were corrected for X-ray exposure variations by normalizing the measured response in each case to an internal standard.

The sharpness of the image storage panels was measured by imaging a series of lead bar test targets and examining the modulation depth of the targets at various bar spacings. The image was captured and read using a KESPR 400 storage phosphor reader (Eastman Kodak Company) and analyzed using proprietary software. The result was reported as the frequency at which the MTF value was 0.50.

The adhesion of the coated image storage layer to the support was tested by cross hatching the surface of the panel with a small knife, applying a tape strip and ripping the tape from the surface. Loss of adhesion was signaled by removal of the phosphor layer from the support surface.

The comparative stiffness of the storage panel was measured as follows. Samples of the panel was cut to a 1 "×6" (2.54 cm×15.2 cm) dimension and held horizontally in clamping jaws such that 0.5 inch (1.25 cm) of one end was covered by the jaws. The vertical deflection of the other end of the sample from the centerline of the clamping jaws was measured with a ruler.

EXAMPLE 1

A storage phosphor panel was prepared as described above using a laminated support within the present invention that was prepared as follows. Two lengths of clear poly (ethylene terephthalate) film support, 0.007 inch (0.02 cm) thick and bearing adhesion promoting layers on each side were mounted onto a roll laminator such that by passing around a pair of chilled laminating rolls from opposite directions, they formed a nip. The two film supports were set in motion around the rolls and molten polyethylene was extruded into the nip, chilled and reformed as a solid, adhering the two polyester supports and forming a laminate structure. The thickness of the dried adhesive layer was about 0.001" (0.0025 cm). The polyethylene (D4002P, Eastman Chemical) used in this instance was tinted black by having incorporated therein a concentrated carbon black/ polyethylene resin (19153-S Ampacet Corp.). The resulting laminated support was formed continuously and wound into roll form. A suitable length of the laminate was removed from the roll and used as the support for the storage phosphor layer and overcoat. The properties of this storage panel are shown in TABLE I below.

EXAMPLE 2

A storage phosphor panel was prepared as described in Example 1 except that the laminating adhesive resin used to adhere the two film supports was poly(ethylene-comethacrylic acid) (EM806-009, Quistar Corp.) that was tinted black with a carbon back/polyethylene concentrate (19153-S Ampacet Corp.). The properties of this storage panel are shown in TABLE I below.

Comparative Example 1

A storage phosphor panel was prepared using as a support a 0.014 inch (0.036 cm) thick poly(ethylene terephthalate) support (1400 gauge Mylar A Dupont Teijin Films). A suitable length of the support was coated with phosphor layer formulation as described above to form the storage panel shown in TABLE I as Comparative Example 1.

Comparative Example 2

A storage phosphor panel was prepared using a 0.014 inch (0.036 cm) thick poly(ethylene terephthalate) support (1400 gauge Mylar A Dupont Teijin Films). The phosphor layer was coated as described above and then an overcoat was applied. Finally, a cellulose acetate layer tinted black with carbon black was applied to the support opposite the side of the phosphor layer. The image storage panel thus formed is shown as Comparative Example 2 in TABLE I.

Comparative Example 3

A storage phosphor panel was prepared using a 0.007 inch (0.018 cm) thick poly(ethylene terephthalate) support (Eastman Kodak Co.). The phosphor was coated as described above and then an overcoat was applied. Finally, a cellulose acetate layer tinted black with carbon black was applied to the support side opposite that of the phosphor. The image storage panel thus formed is shown as Comparative Example 3 in TABLE I below.

TABLE I

| Storage Panel | Relative Speed | Relative Sharpness | Adhesion | Flexibility (cm of deflection) |
|---|---|---|---|---|
| Example 1 | 151 | 1.33 | Excellent | 0.38 |
| Example 2 | 152 | 1.35 | Excellent | 0.38 |
| Comparative Example 1 | 160 | 1.10 | Phosphor layer partly removed | 1.14 |
| Comparative Example 2 | 157 | 1.13 | Phosphor layer partly removed | 1.02 |
| Comparative Example 3 | 150 | 1.35 | Excellent | 4.50 |

The results shown in TABLE I demonstrate the advantages of the invention. The laminated supports of the invention in Examples 1 and 2 show significantly improved stiffness, and yet maintained the speed, sharpness and excellent adhesion of the thinner, single substrate shown in Comparative Example 3. The presence of the adhesion-promoting layers applied to the individual members of the laminate during support manufacture and thus present in the laminated structure, provides the examples of this invention with adhesion advantages over the thick supports of Comparative Examples 1 and 2. In addition, the presence of the tinted adhesive layer in the laminated structures of Examples 1 and 2 resulted in significantly better sharpness than with the thick, somewhat translucent supports of Comparative Examples 1 and 2. In the case of Comparative Example 2, even the application of a black tinted layer to the backside of the support did not result in the sharpness obtained in the panels of the present invention.

The invention has been described in detail with particular reference to certain preferred embodiments thereof, but it will be understood that variations and modifications can be effected within the spirit and scope of the invention.

We claim:

1. A radiographic storage panel comprising a support having thereon a storage phosphor layer, said support comprising two or more flexible substrates adhered to each other.

2. The storage panel of claim 1 wherein said support comprises two flexible substrates, each substrate composed of a polymeric material.

3. The storage panel of claim 2 wherein each of said substrates is composed of poly(ethylene terephthalate).

4. The storage panel of claim 2 wherein said substrates have different thickness.

5. The storage panel of claim 2 wherein each of said substrates is composed of poly(ethylene terephthalate) and where the substrate closest to the storage phosphor layer is optically clear and transparent.

6. The storage panel of claim 1 wherein said support comprises two flexible substrates adhered together with a tinted adhesive material comprising a tinting substance that absorbs stimulating radiation.

7. The storage panel of claim 1 wherein said support comprises two or more flexible substrates adhered together with a polyethylene-based hot-melt adhesive.

8. The storage panel of claim 1 wherein said support comprises two flexible substrates adhered together with a polyethylene-based hot-melt adhesive that is tinted to absorb the stimulating radiation.

9. The storage panel of claim 1 wherein said support comprises two flexible substrates adhered together with a polyethylene-based hot-melt adhesive that is tinted with carbon black to a density of at least 1.5.

10. The storage panel of claim 1 wherein said support is from about 200 $\mu$m to about 450 $\mu$m thick.

11. The storage panel of claim 1 wherein said two or more flexible substrates are co-extruded, and at least one of said flexible substrates is tinted to absorb the stimulating radiation.

12. The storage panel of claim 1 wherein said phosphor layer comprises one or more alkaline earth metal fluorohalide phosphors.

13. The storage phosphor panel of claim 12 wherein said phosphor consists essentially of a combination of species characterized by the relationship:

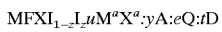

wherein M is Mg, Ca, Sr, or Ba, F is fluoride, I is iodide, X is Cl or Br, $M^a$ is Na, K, Rb, or Cs, $X^a$ is F, Cl, Br, or I, A is Eu, Ce, Sm, or Tb, Q is BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, or $ThO_2$, D is V, Cr, Mn, Fe, Co, or Ni, z is from $1\times10^{-4}$ to 1, u is from 0 to 1, y is from $1\times10^{-4}$ to 0.1, e is from 0 to 1, and t is from 0 to $10^{-2}$.

14. The storage phosphor panel of claim 13 wherein said phosphor further comprises the product of thermal decomposition of oxosulfur reducing agent for iodine present in an amount sufficient to increase relative photostimulated luminescence intensities relative to said phosphor absent said reducing agent for iodine.

15. The storage panel of claim 1 wherein said phosphor layer comprises at least 50 weight percent phosphor based on total dry layer weight, and at least 4 weight percent binder based on total phosphor dry weight.

16. The storage panel of claim 1 further comprising a protective overcoat layer disposed on said phosphor layer.

17. A radiographic storage panel having an overcoat layer over a storage phosphor layer, which storage phosphor layer is disposed on a support comprising two or more flexible substrates adhered to each other.

18. A radiographic assembly comprising a light-tight container having therein a radiographic storage panel comprising a support having thereon a storage phosphor layer, said support comprising two or more flexible substrates adhered to each other.

* * * * *